Figure 1:
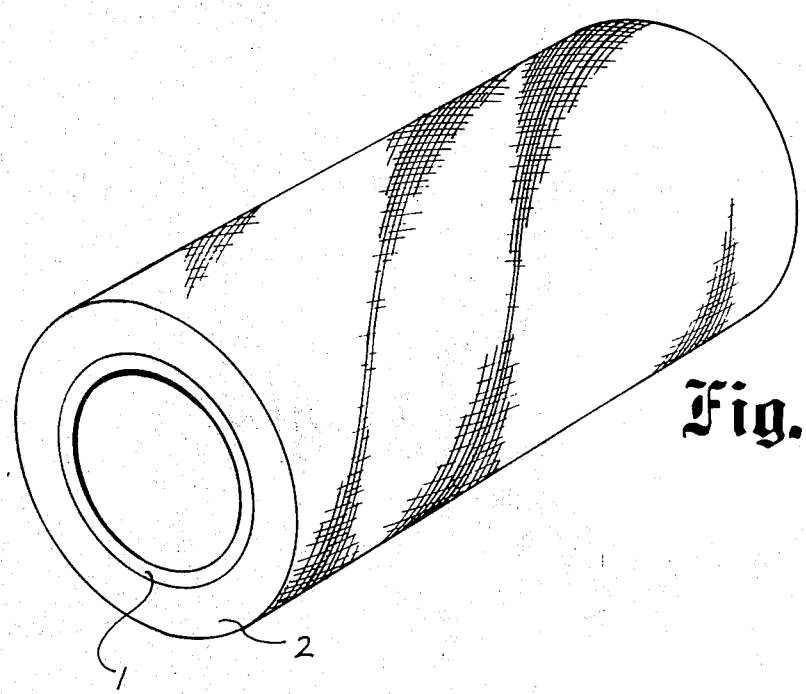

United States Patent

[11] 3,542,079

[72] Inventor Mark E. Kelly, Jr.
　　　　　　　Midland, Michigan
[21] Appl. No. 697,594
[22] Filed Jan. 15, 1968
[45] Patented Nov. 24, 1970
[73] Assignee A. O. Smith Corporation
　　　　　　　Milwaukee, Wisconsin
　　　　　　　a corporation of New York

[54] GLASS REINFORCED PLASTIC ARTICLE
　　　6 Claims, 2 Drawing Figs.
[52] U.S. Cl. .................................................. 138/141,
　　　138/153; 156/62.2, 156/172, 156/330
[51] Int. Cl. ................................................. F16l 9/16
[50] Field of Search ......................................... 138/153,
　　　174, 145, 172, 141, 144, glass fiber digest;
　　　264/209; 156/330, 62.2, 172gfd

[56] References Cited
UNITED STATES PATENTS
2,360,109 10/1944 Converse ..................... 138/145

| | | | |
|---|---|---|---|
| 2,391,468 | 12/1945 | Long ............................ | 138/145X |
| 2,467,999 | 4/1949 | Stephens ...................... | 138/174X |
| 2,653,887 | 9/1953 | Slayter ......................... | 138/145X |
| 2,816,322 | 12/1957 | Bjorksten ..................... | 264/209 |
| 2,884,010 | 4/1959 | Fischer ......................... | 138/144 |
| 3,002,534 | 10/1961 | Noland ......................... | 156/172X |
| 3,212,529 | 10/1965 | Ullman et al. ................ | 138/141 |
| 3,414,460 | 12/1968 | Hassert et al. ................ | 156/172X |

Primary Examiner—Samuel Rothberg
Assistant Examiner—Henry K. Artis
Attorneys—Andrus and Starke, Merle E. Sceales and Howard J Barnett ABSTRACT: The invention relates to a glass reinforced plastic pipe having improved chemical resistance and including an inner layer of haphazardly arranged glass fibers impregnated with an epoxide resin with the glass of the inner layer containing a high proportion of alkali metal oxides. Surrounding the inner layer is an outer layer formed of helically wound glass fibers bonded with an epoxide resin and the glass of the outer layer contains a high proportion of aluminum oxide.

Patented Nov. 24, 1970

3,542,079

INVENTOR.
Mark E. Kelly JR.
BY
Andrus, Scales, Starke & Sawall

Attorneys

GLASS REINFORCED PLASTIC ARTICLE

Fiber reinforced plastic pipe is generally fabricated by winding strands of glass fibers about a mandrel and bonding the fibers together with a thermosetting resin such as an epoxide resin. Where the conventional pipe is exposed in service to acids or strong alkaline materials, it has been found that the pipe is readily attacked by the chemicals so that failure results in a relatively short period of service. It has been discovered that failure is not due to the attack on the resin but instead, is due to chemical attack on the glass fibers. To counter this chemical erosion and provide increased chemical resistance, it has been proposed to fabricate reinforced plastic pipe with a resin-rich inner layer having a minimum glass reinforcement. More specifically, a conventional glass reinforced plastic pipe to be used in chemical service may consist of an inner liner consisting of glass mat impregnated with resin, with the resin consisting of about 90 percent by weight of the inner layer. Applied to the outer surface of the inner layer is a series of layers of helically wound, substantially continuous glass fibers impregnated with resin which provide the necessary strength for the tubular article. Nevertheless, the conventional plastic pipe utilizing the resin-rich inner layer has drawbacks in that the inner layer lacks adequate reinforcement which may detract from the physical performance of the pipe, and even though the amount of glass fiber reinforcement in the inner layer is minimized, it is none the less subject to chemical attack.

The present invention is directed to a glass reinforced plastic article having improved chemical resistance.

Figure 2:
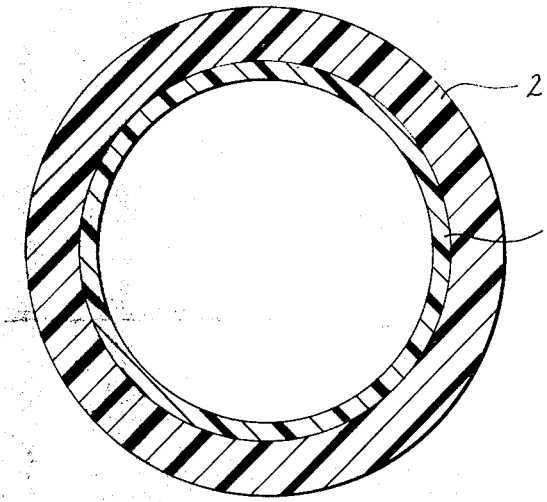

FIG. 1 is a perspective view of the reinforced tubular member of the invention; and FIG. 2 is a cross section of the tubular member illustrated in FIG. 1.

The article comprises an inner layer 1 formed of haphazardly arranged glass fibers bonded with an epoxide resin, and the glass of the inner layer 1 contains a high percentage of alkali metal oxides. Surrounding the inner layer 1 is an outer layer 2 formed of helically wound glass fibers bonded with an epoxide resin and the glass of the outer layer 2 has a high percentage of aluminum oxide. The tubular member prepared in accordance with the invention has marked improvement in chemical resistance over conventional glass reinforced plastic articles.

The inner layer 1 of the pipe is composed of haphazardly arranged fibers in the form of matting or the like, which are formed of a glass known in the trade as C glass having the following general formulation:

| | Percent |
|---|---|
| $SiO_2$ | 60–67 |
| $Al_2O_3$ | 2–8 |
| $B_2O_3$ | 1–8 |
| $Na_2O + K_2O$ | 8–16 |
| $MgO + CaO$ | 5–20 |

A specific illustration of a glass composition falling within the above range is as follows in weight percent:

| | Percent |
|---|---|
| $SiO_2$ | 62.5 |
| $Al_2O_3$ | 5.8 |
| $B_2O_3$ | 3.6 |
| $Na_2O + K_2O$ | 12.0 |
| $MgO + CaO$ | 16.1 |

The glass of the inner layer 1 is impregnated with the epoxide resin by conventional techniques. In some cases the glass mat may be preimpregnated with the uncured resin, while in other cases the mat can be applied directly to a mandrel and the resin, in liquid form, is then applied to, and worked into the glass mat.

The epoxide resins or glycidyl polyethers which are employed to impregnate the fibrous material are conventional types which may be prepared by condensing a polyhydric phenol with a polyepoxide or poly-functional halohydrin, as disclosed, for example in U.S. Pat. No. 2,801,227 entitled "Process for Manufacture of Glycidyl Ethers of Polyhydric Phenols." The epoxide resins are generally prepared by heating the polyhydric phenol with the halohydrin at a temperature in the range of 50 to 150°C. and using 1 to 2 or more mols of the halohydrin per mol of the polyhydric phenol. An alkaline material, such as sodium or potassium hydroxide, is used in a stoichiometric excess of about 2 to 5 percent to the halohydrin. The heating is continued for several hours to effect the reaction and the product is then washed free of salt and base. The product is not a single simple compound but is generally a complex mixture of glycidyl polyethers and the principal product may be represented by the formula

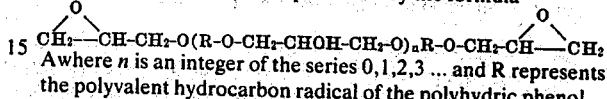

where $n$ is an integer of the series 0,1,2,3 ... and R represents the polyvalent hydrocarbon radical of the polyhydric phenol.

The epoxide resins used in the invention normally have an epoxy equivalency greater than 2. By the epoxy equivalency is meant the average number of epoxy groups contained in the average molecule of the glycidyl ether.

The curing agents used to cure the epoxide resin to its infusible, rigid state may take the form of 4, 4' methylene dianiline, ethylene diamine, metaphenylene diamine, triethylene triamine, diamino diphenyl sulfone, acid anhydrides such as phthalic, dodecenyl, succinic and chlorendic anhydrides and the like.

The glass mat comprises from 5 to 50 percent by weight of the combined weight of the glass mat and resin in the inner layer and preferably about 5 to 15 percent.

The glass mat for the inner layer 1 generally has a thickness in the range of 15 to 25 mils as applied to the mandrel, and this layer will generally compress to a final liner thickness of about 10 to 15 mils after application of the outer helical windings.

The outer layer 2 of the pipe is composed of substantially continuous glass fibers which are wound circumferentially, or in a generally helical pattern, around the inner layer. The glass fibers may take the form of roving, braided tubing, woven fabric and the like, and the glass fibers are generally applied in a series of superimposed layers with each alternate layer having the opposite helix angle. The number of layers of helically wound glass to be applied depends on the strength required and the ultimate use of the article.

The glass of the outer layer 2 is a form of glass referred to as S glass in the trade and has the following general composition in weight percent:

| | Percent |
|---|---|
| $SiO_2$ | 60–67 |
| $Al_2O_3$ | 20–30 |
| $CaO$ | 0–3 |
| $B_2O_3$ | 0–2 |
| $MgO$ | 5–12 |
| $TiO_2$ | 0–1 |
| $Na_2O + K_2O$ | 0–1 |

A specific illustrate of an S glass formulation falling within the above range is as follows in weight percent:

| | Percent |
|---|---|
| $SiO_2$ | 63 |
| $Al_2O_3$ | 26 |
| $CaO$ | 0.5 |
| $B_2O_3$ | 0.1 |
| $MgO$ | 9.4 |
| $TiO_2$ | 0.015 |
| $Na_2O$ | 0.25 |

The glass of the outer layer 2 of the pipe is impregnated with an epoxide resin similar to that used to impregnate the inner layers of the pipe. The glass fibers generally comprise about 50 to 80 percent by weight of the combined weight of the glass fibers and resin in the outer layers and preferably about 60 to 70 percent.

In fabricating the pipe or tubular article, the glass mat of the inner layer 1, either preimpregnated with the resin or unimpregnated, is applied to the mandrel to the desired layer thickness. If the glass mat is not impregnated with resin, the resin is than applied over the glass mat and worked into the fibers. Following this, the helical windings of the S glass fibers forming layer 2 are applied over the glass mat and the glass fibers can be impregnated with the resin by any desired method, such as passing the fibers through a resin bath, brushing, dipping or spraying. After the desired number of layers of the S glass have been wound over the inner layer 1 of glass mat, the article is heated to a temperature generally in the range of 200 to 350°F. for a period of time sufficient to cure or polymerize the epoxide resin, thereby resulting in an integrally bonded structure.

The following table illustrates the hoop tensile strength retention of various glass fiber reinforced plastic pipes when exposed to various alkali and acidic materials at elevated temperatures. Sample I is formed according to the invention and consists of an inner layer of C glass mat having a compressed thickness of about 12 mils and a glass-to-resin ratio of 1 to 5, and an outer layer 2 of helical windings of S glass, both of which were impregnated with an epoxide resin.

Sample II in the following table is a tubular article formed solely of helical windings of S glass fibers bonded with an epoxide resin, while Sample III is a tubular article formed with an inner layer of C glass mat having a compressed thickness of about 12 mils and a glass-to-resin ratio of 1 to 5, and an outer layer of helically wound C glass fibers, both of which are bonded with an epoxide resin. Sample IV is a tubular article formed solely of helically wound C glass fibers bonded with an epoxide resin.

invention can be utilized to form a laminated article of any desired configuration and has particular application for a laminated article adapted to be exposed in service to chemical solutions or agents.

Various modes of carrying out the invention are contemplated as being within the scope of the following claims particularly pointing out and distinctly claiming the subject matter which is regarded as the invention.

I claim:
1. A reinforced article adapted to be exposed in service to chemical solutions, comprising a first layer composed of haphazardly arranged glass fibers impregnated with an epoxide resin, said glass fibers formed of a glass having the following composition in weight percent:

| | Percent |
|---|---|
| $SiO_2$ | 60–67 |
| $Al_2O_3$ | 2–8 |
| $B_2O_3$ | 1–8 |
| $Na_2O + K_2O$ | 8–16 |
| $MgO + CaO$ | 5–20 | and a second layer composed of substantially continuous glass fibers circumferentially disposed around the inner layer and impregnated with an epoxide resin, said substantially continuous fibers being formed of a glass having the following composition in weight percent:

| | Percent |
|---|---|
| $SiO_2$ | 60–67 |
| $Al_2O_3$ | 20–30 |
| $CaO$ | 0–3 |
| $B_2O_3$ | 0–2 |
| $MgO$ | 5–12 |
| $TiO_2$ | 0–1 |
| $Na_2O + K_2O$ | 0–1 |

| | | Hoop tensile strength retention, percent | | | | | | | |
|---|---|---|---|---|---|---|---|---|---|
| | Temp., °F. | Sample I | | Sample II | | Sample III | | Sample IV | |
| Solution | | 1 mo. | 4 mo. | 1 mo. | 4 mo. | 1 mo. | 4 mo. | 1 mo. | 4 mo. |
| HA, 10.5% | 205 | 120.0 | 118.9 | 77.5 | 69.0 | 38.3 | 33.7 | 55.6 | 43.6 |
| HA, 36.5% | 205 | 109.3 | 91.0 | 53.0 | 37.7 | 58.5 | 46.1 | 50.7 | 31.6 |
| $H_2SO_4$, 10% | 205 | 113.1 | 110.7 | 72.5 | 64.3 | 35.3 | 26.5 | 47.8 | 38.1 |
| $H_2SO_4$, 50% | 205 | 129.3 | 138.3 | 94.5 | 78.4 | 69.8 | 62.5 | 86.9 | 77.8 |
| NaOH, 10% | 205 | 114.3 | 113.9 | 60.1 | 38.9 | 43.8 | 29.4 | | |
| Wet $Cl_2$ | 205 | 117.9 | 79.6 | 75.3 | 86.9 | 29.3 | 40.9 | 43.4 | 38.6 |
| Ethyl acetate | 120 | 136.8 | 99.6 | 91.3 | 61.1 | 75.5 | 43.5 | 91.3 | 67.0 |
| Chloro benzene | 150 | 125.5 | 118.6 | 77.1 | 69.8 | 54.6 | 48.0 | 63.2 | 48.5 |
| Water | 205 | 113.5 | 110.9 | 70.3 | 67.3 | 36.9 | 32.6 | 32.8 | 29.3 |

From the foregoing Table, it can be seen that the tubular article, Sample I, prepared in accordance with the invention, had a hoop strength retention after a 1 month period which was substantially higher in all cases than the hoop tensile strength of the identical control sample which was not exposed to the solution and considered for comparative purposes to be 100 percent. Moreover, the retained hoop tensile strength of Sample I after 4 months of exposure was, in most cases, higher than that of the control sample. In contrast to this, the hoop tensile strength retention of Samples II, III and IV was, in all cases, less than that of the control sample and substantially below the hoop tensile strength retention of Sample I for the corresponding solutions.

The S glass, which contains a high percentage of aluminum oxide, is considered in the art to be a relatively chemical resistant type of glass having substantially greater resistance to chemical attack than C glass used for the inner layer 1. However, the invention shows that utilizing the C glass inner layer, even though C glass is recognized as being less chemical resistant than S glass, produces a very substantial improvement in the overall chemical resistance of the tubular article. This is completely unobvious, for it would normally be expected that a pipe formed solely of a known chemical resistant type of glass, such as Sample II in the foregoing table, would be more resistant to chemical attack than one having an inner liner of a glass which is not particularly resistant to chemical attack.

While the above description has been directed to the fabrication of a pipe or tubular article, it is contemplated that the 2. The article of claim 1 wherein said article is tubular in shape and said first layer comprises an annular liner and said second layer comprises an annular section disposed around said liner.

3. The structure of claim 2, wherein said haphazardly arranged fibers are in the form of matting and the continuous fibers are helically arranged in a series of superimposed layers with each alternate layer having the opposite helix angle.

4. The structure of claim 1, wherein the glass fibers in the inner layer comprise from 5 to 50 percent by weight of said inner layer and the glass fibers in said outer layer comprise from 50 to 80 percent of the weight of said outer layer.

5. The structure of claim 1 wherein the inner layer has a thickness in the range of 15 to 25 mils.

6. A glass reinforced tubular article adapted to be exposed in service to chemical agents, comprising an inner layer composed of glass matting impregnated with a cured epoxide resin, said glass fibers having the following composition in weight percent:

| | Percent |
|---|---|
| $SiO_2$ | 60–67 |
| $Al_2O_3$ | 2–8 |
| $B_2O_3$ | 1–8 |
| $Na_2O + K_2O$ | 8–16 |
| $MgO + CaO$ | 5–20 | and an outer layer composed of substantially continuous glass fibers helically wound around the inner layer and impregnated with cured epoxide resin, said substantially continuous glass fibers having the following composition in weight percent:

| | Percent |
|---|---|
| $SiO_2$ | 60–67 |
| $Al_2O_3$ | 20–30 |
| $CaO$ | 0–3 |
| $B_2O_3$ | 0–2 |
| $MgO$ | 5–12 |
| $TiO_2$ | 0–1 |
| $Na_2O + K_2O$ | 0–1 |